United States Patent [19]

Ichinohe et al.

[11] Patent Number: 5,288,831
[45] Date of Patent: Feb. 22, 1994

[54] ODOR-FREE PURIFIED POLYETHER SILICONES AND METHOD FOR THEIR PRODUCTION

[75] Inventors: Shoji Ichinohe; Hideyuki Kawamoto, both of Gunma, Japan

[73] Assignee: Shin-Etsu Chemical Co., Ltd., Tokyo, Japan

[21] Appl. No.: 828,824

[22] Filed: Jan. 31, 1992

Related U.S. Application Data

[62] Division of Ser. No. 524,309, May 17, 1990, Pat. No. 5,118,767.

[30] Foreign Application Priority Data

May 17, 1989 [JP] Japan .................. 1-123053

[51] Int. Cl.$^5$ .............................................. C08G 77/14
[52] U.S. Cl. ........................................ 528/25; 528/15; 528/31; 556/445; 556/479; 556/462; 525/478
[58] Field of Search ............... 556/479, 462, 445; 528/15, 31, 25; 525/478

[56] References Cited

U.S. PATENT DOCUMENTS

| | | | |
|---|---|---|---|
| 4,515,979 | 5/1985 | Otsuki et al. | 556/445 |
| 4,520,160 | 5/1985 | Brown | 524/765 |
| 4,587,320 | 5/1986 | Swihart | 528/23 |
| 4,956,206 | 9/1990 | Kaiya et al. | 427/387 |
| 5,075,403 | 12/1991 | Kirk | 528/15 |
| 5,082,916 | 1/1992 | Mikami et al. | 528/26 |
| 5,225,509 | 7/1993 | Heinrich et al. | 528/12 |

Primary Examiner—John C. Bleutge
Assistant Examiner—Margaret W. Glass
Attorney, Agent, or Firm—Millen, White, Zelano, & Branigan

[57] ABSTRACT

Disclosed are purified polyether silicone addition reaction products of a hydrogen siloxane and a polyoxyalkylene containing a terminal double bond, which in unpurified form contains one or both of unreacted polyoxyalkylene and internal rearrangement side reaction products thereof which generate unpleasant odors in the reaction product upon storage and upon contact with water, substantially free from said unreacted polyoxyalkylene and rearrangement products thereof so that the total quantity of ketones and aldehydes produced by a treatment of the purified polyether silicones in a closed system at 60° C. for 24 hours with a quantity of 10$^{-4}$N aqueous hydrochloric acid equivalent to the quantity of said polyether silicones, is no greater than 1,000 ppm of said polyether silicones, which purified polyether silicones are obtained by treating the unpurified form thereof with water, an aqueous solution of pH no greater than 7 or an acidic material, until substantially all of the odorous substances are produced and then removing the odorous substances therefrom.

20 Claims, No Drawings

ODOR-FREE PURIFIED POLYETHER SILICONES AND METHOD FOR THEIR PRODUCTION

This is a division of application Ser. No. 07/524,309 filed May 17, 1990, U.S. Pat. No. 5,118,767.

INDUSTRIAL FIELD OF THE INVENTION

This invention relates to purified polyether silicones, more particularly, purified polyether silicones which generate very little odor on storage or when blended with water-based systems, and to a method of treating odor-generating polyether silicones to obtain purified polyether silicones.

BACKGROUND OF THE INVENTION

Conventionally, polyether silicones are obtained by addition reactions of hydrogen siloxanes and polyoxyalkylenes (polyethers) containing terminal double bonds in the presence of noble metal catalysts such as chloroplatinic acid.

However, when the polyether silicones thus obtained are used in an emulsion system, they tend to generate an odor and are therefore difficult to incorporate in cosmetics. These disadvantages were thought to be due to the fact that the polyether silicones suffered oxidative degradation to produce odorous aldehydes with the passage of time.

The present inventors studied the mechanism of this acquisition of odor in more detail and found that the odor was due to an internal rearrangement side reaction of the polyoxyalkylene which occurred in the presence of the platinum catalyst employed to produce the silicones so that it does not react with the hydrogen siloxane and remains in the polyether silicone produced by the main reaction, and is also due to unreacted polyoxyalkylene remaining in said polyether silicone. These impurities decompose with time to produce odorous ketones and aldehydes.

When, for example, allyl ether polyether is used as the polyoxyalkylene and is reacted with a hydrogen siloxane in the presence of a platinum catalyst, the allyl group of a portion thereof undergoes an internal rearrangement as a side reaction to produce propenyl ether polyether. This propenyl ether polyether does not react with the hydrogen siloxane and therefore remains as an impurity in the polyether silicone produced by the main reaction. Unreacted allyl polyether also remains as an impurity in the polyether silicone. The unreacted allyl polyether is also gradually isomerized by residual platinum catalyst remaining in the polyether silicone into propenyl ether polyether.

Apparently when water or atmospheric moisture contacts a polyether silicone containing these impurities, the propenyl ether is cleaved, and propionaldehyde, which has an unpleasant odor, is produced. This reaction is accelerated in the presence of acid and the lower the pH the greater the reaction rate.

The present inventors, knowing the above odor-producing mechanism, determined that by treating polyether silicones containing said impurities with water or an aqueous solution of pH no greater than 7 or an acidic material until all of the odorous substances are produced and then removing these odorous substances, the thus-purified polyether silicones no longer acquired any unpleasant odor with the passage of time or when contacted with water.

SUMMARY OF THE INVENTION

One object of this invention is therefore to provide polyether silicones which do not generate an unpleasant odor even after being stored for a long period of time.

A further object of this invention is to provide a method of treating polyether silicones which acquire an unpleasant odor with the passage of time, such that they become odorless.

In a composition aspect, this invention relates to purified polyether silicone addition reaction products of a hydrogen siloxane and a polyoxyalkylene containing a terminal double bond, which in unpurified form contains one or both of unreacted polyoxyalkylene and internal rearrangement side reaction products thereof which generate unpleasant odors in the reaction product upon storage and upon contact with water, substantially free from said unreacted polyoxyalkylene and rearrangement products thereof, preferably those wherein the degree of unsaturation thereof due to the presence therein of unreacted polyalkoxyalkylene and internal rearrangement side reaction products thereof is no greater than 0.02 and the total quantity of ketones and aldehydes produced by a treatment of the purified polyether silicone in a closed system for 24 hours with a quantity of $10^{-4}N$ aqueous hydrochloric acid equivalent to the quantity of said polyether silicones at 60° C., is no greater than 1,000 ppm calculated on said polyether silicones, preferably no greater than 100 ppm.

In a method aspect, this invention relates to a method for the production of a purified polyether silicone of this invention, which comprises treating the odor generating unpurified form thereof with water, an aqueous solution of pH no greater than 7, or with an acidic material, until substantially all of the polyoxyalkylene and rearrangement products thereof are converted to odorous substances, and then removing the odorous substances from the thus-treated polyether silicone.

Polyether silicones of the present invention can thus be used in end-use applications from which they were formerly precluded and are therefore highly useful commercially.

Upon further study of the specification and appended claims, further objects and advantages of this invention will become apparent to those skilled in the art.

DETAILED DESCRIPTION OF THE INVENTION

The starting unpurified polyether silicones of this invention are known in the art. They preferably are produced by an addition reaction of at least one of hydrogen siloxane represented by the structural formula:

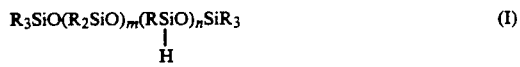

(I)

wherein R is a univalent substituted or unsubstituted hydrocarbon group, m is 0 or a positive integer, and n is a positive integer, or

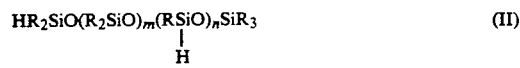

(II)

wherein R and m have the same values as in formula (I), and n is 0 or a positive integer, or $$HR_2SiO(R_2SiO)_m(RSiO)_nSiR_2H \quad \text{(III)}$$
$$\underset{H}{|}$$

wherein R, m and n have the same values as in formula (II); with a polyoxyalkylene (polyether) represented by the formula:

$$BO(C_pH_{2p}O)_xR'' \quad \text{(IV)}$$

wherein B is a hydrocarbon group containing terminal double bonds, R'' is hydrogen or a low grade alkyl group or acyl group, p is 2 or 3, and x is a positive integer; in the presence of a platinum catalyst. In Formula (IV), the $(C_pH_{2p}O)$ polymer unit can represent a homopolymeric group, e.g., $(C_2H_4O)$, or a block polymer group, e.g., $-(C_2H_4O)-(C_3H_6O)-$.

Preferably the main component of the polyether silicones is a organopolysiloxane containing a polyoxyalkylene group represented by the formula:

$$R_3SiO(R_2SiO)_m(RSiO)_nSiR_3 \quad \text{(V)}$$
$$\underset{R'}{|}$$
$$\underset{O(C_pH_{2p}O)_xR''}{|}$$

wherein R, m and n have the same values as in formula (I); R'', p and x have the same values as in formula (IV); and R' is a bivalent hydrocarbon group, or $$AR_2SiO(R_2SiO)_m(RSiO)_nSiR_3 \quad \text{(VI)}$$
$$\underset{A'}{|}$$

wherein A and A' are both represented by the formula: $-R'O(C_pH_{2p}O)_xR''$; wherein R, R', R'', m, p and x have the same significance as in formula (V); and n is 0 or a positive integer, or $$AR_2SiO(R_2SiO)_m(RSiO)_nSiR_2A \quad \text{(VII)}$$
$$\underset{A'}{|}$$

wherein A, A', R, m and n have the same values s in formula (VI).

Said addition reaction can be performed in an organic solvent such as alcohols (e.g., ethanol and isopropyl alcohol), aromatic hydrocarbons (e.g., toluene and xylene), ethers (e.g., dioxane and THF), aliphatic hydrocarbons, esters, ketones and chlorinated hydrocarbons. The reaction temperature is normally at an elevated temperature above room temperature, e.g., 50°-150° C. Post-reaction treatment is then carried out by completely reacting all residual SiH groups with a compound containing a double bond, such as 1-hexene, to completely eliminate SiH groups or adding an alkaline substance such as caustic soda to dehydrogenate residual SiH groups.

Polyether silicones are normally isolated merely by removing solvent from the above reaction solution. In the conventional commercial process, and in particular when the addition reaction is carried out in the presence of a platinum catalyst, an internal rearrangement of the terminal double bond of a portion of the polyoxyalkylene takes place. In the case of a polyoxyalkylene having a terminal allyl ether group, a propenyl ether polyoxyalkylene (propenyl ether polyether) is produced.

Even if an excess of hydrogen siloxane is used with respect to the theoretical quantity of polyoxyalkylene containing terminal double bonds, isomerization of the polyoxyalkylene still occurs at the same time as the main addition reaction, so that the formation of a polyether isomerization product containing internal double bonds is inevitable. Moreover, as is well known in silicone chemistry research, polyethers with internal double bonds do not react with hydrogen siloxanes, and therefore these isomerized by-products inevitably remain in the system.

For these reasons, the polyether silicones synthesized in the presence of a platinum catalyst heretofore always contained some residual polyethers with terminal and internal double bonds, and the degree of unsaturation of the whole system, i.e., the total reaction product, was no less than 0.02 (meq/g).

Polyether silicones tend to become more acidic with time due to oxidative degradation of these polyethers, and if such polyether silicones are incorporated in water-base cosmetics, the system becomes acidic. Propenyl ether polyether is however gradually decomposed by aqueous solutions of pH no greater than 7, and propionaldehyde is produced which has an unpleasant odor.

Due to the unpleasant odor produced with time as described above, it was difficult to incorporate large quantities of polyether silicones into hair care, skin care and make-up cosmetics, and it was particularly difficult to incorporate them into skin care and make-up cosmetics applied close to the nose. This invention overcomes these disadvantages merely by treating these odor generating polyether silicones with water, an aqueous solution of pH no greater than 7, or an acidic substance, e.g., a mineral acid, an organic acid or a Lewis acid, preferably with the application of heat, until all of residual propenyl ether polyether is decomposed, and the thus-produced propionaldehyde is then removed therefrom.

The purified polyether silicone thus obtained is substantially free from the polyethers with double bonds present in the starting polyether silicones prior to treatment, i.e., the degree of unsaturation of said polyether silicones (meq/g) easily attains a level of no greater than 0.02, and even can be no greater than 0.002. The quantity of ketones and aldehydes produced by aging the thus-treated polyether silicones in $10^{-4}N$ hydrochloric acid at 60° C. for 24 hours is therefore no greater than 1,000 ppm, and preferably is no greater than 100 ppm, of the polyether silicone.

When the starting polyether silicone is a blend of silicones and the odor-producing polyether silicone content thereof is small, because the proportion of polyethers containing terminal double bonds employed to produce them is small, the quantity of ketones and aldehydes produced by aging the unpurified blend by the aging test described above may be no more than 1,000 ppm, e.g., 500-1000 ppm. Even in such cases, the odor generating characteristic of these polyether silicones is still significant and is easily eliminated by the method of this invention, so that the quantity of aldehydes and ketones produced by the above-described aging test may well attain a level of 10 ppm or less.

Although the polyethers containing double bonds can be decomposed by an acidic material alone without the concurrent use of water, if water is not used a large quantity of the acidic material will be required. Therefore, an aqueous acidic solution preferably is employed, i.e., of pH less than 7, preferably less than 5.

In the present invention any acidic material, such as mineral acids, organic acids and acidic salts and Lewis acids, can be used.

Mineral acids that can be used include hydrochloric acid, sulfuric acid, nitric acid, carbonic acid and phosphoric acid.

Organic acids that can be used include carboxylic acids such as formic acid, acetic acid and trifluoroacetic acid, sulfonic acids and sulfenic acids, phenols, primary and secondary nitro-compounds and Lewis acids.

The Lewis acids that can be used include $AlCl_3$, $FeCl_3$, $TiCl_4$, and $BF_3$. These acids may be used either alone or in conjunction with water, but when it is necessary to remove the acid, it is preferable to use low boiling acids such as hydrochloric acid, formic acid, acetic acid and trifluoroacetic acid. From an efficiency of the treatment, it is desired to use a strong acid such as hydrochloric acid and trifluoroacetic acid. In general, it is preferable to use the acids in conjunction with water rather than alone. It is also preferable to heat to a temperature below the boiling point of water, i.e., below 100° C. In this way, the decomposition of polyethers containing internal double bonds proceeds more rapidly.

If, for example, hydrochloric acid is used as the treatment agent, a concentration of $10^{-4}N$ hydrogen chloride is sufficient, in which case the pH of the hydrochloric acid will then be 4.0. To further accelerate the decomposition reaction, $10^{-3}N$ hydrochloric acid may be used. If about 10 wt. % of this acid is used for a polyether silicone obtained from allyl ether polyether, for example, the decomposition reaction is complete in several hours, and polyethers with internal double bonds such as propenyl ether polyether are almost completely eliminated. In this case, the amount of hydrogen chloride used with respect to the polyether silicone will be 3.6 ppm.

If desired, concentrated acid, e.g., hydrochloric acid, can be added first and water or steam introduced later, but in the case of steam and hydrochloric or other volatile acid, care must be taken that the volatile acid is not discharged out of the system together with the steam.

Alternatively, a high boiling acid may be added and steam introduced later. In this case, the polyether containing internal double bonds can be decomposed in even less time. However, it may be necessary to neutralize any remaining acid. In any case, if water is used in conjunction with strong acid, it is sufficient if the quantity of acid is several, e.g., 2–3 or more, ppm with respect to the quantity of polyether silicone. If the treatment temperature is increased to 80° C. or more and the treatment time to 10 hours or more, the quantity of acid may be decreased accordingly by one or two digits.

The quantity of water used may be chosen as convenient, but preferably is 0.1–100 wt. % and more preferably 1–10 wt. % with respect to the quantity of the starting polyether silicone.

Hydrochloric acid may, for example, be added directly to the starting polyether silicone to decompose polyethers containing double bonds after removal of the reaction solvent. Alternatively, hydrochloric acid may be added to the reaction solution after completion of the addition reaction of the hydrogen siloxane with the polyethers containing terminal double bonds in the presence of the platinum catalyst, to decompose the residual unsaturated polyethers, thereby forming the odorous aldehydes and ketones, and then removing them along with the hydrogen chloride and reaction solvent.

From the viewpoint of productivity, it is preferable to use the latter method wherein an aqueous solution of pH no greater than 7 is added to the post-reaction solution, with heating and stirring, and then carrying out a strip purification of the thus-treated polyether silicone.

Said strip purification may be carried out under normal pressure or under reduced pressure. It is, however, preferable to use a temperature no greater than 120° C. To carry out an efficient strip purification under these temperature conditions, the purification should either be carried out under reduced pressure or in a stream of an inert gas, e.g., nitrogen.

In the prior art, odorous constituents are often eliminated from substances by steam distillation. However, even if polyether silicones were rendered temporarily odorless by this procedure, the decomposition of polyethers with double bonds which are present in the polyether silicones as impurities would be incomplete. As a result, when the thus-treated polyether silicones were blended in a water-based system, odorous aldehydes and ketones invariably would be produced, and it was impossible to prevent the thus-treated polyether silicones from acquiring an odor.

In this invention on the other hand, the polyethers with double bonds which are present in the polyether silicones as impurities are substantially completely decomposed into aldehydes or ketones and polyoxyalkylene glycol. These aldehydes and ketones are then eliminated so that even if the purified polyether silicones are blended in a water-based system, they do not acquire an unpleasant odor with time.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, if any, cited above and below, including Japanese 123053/89, filed May 17, 1989, are hereby incorporated by reference.

EXAMPLES

This invention is described in more detail with reference to the examples which follow but it should be understood that the invention is by no means limited to them.

EXAMPLE 1

717 g of a hydrogen siloxane of average composition:

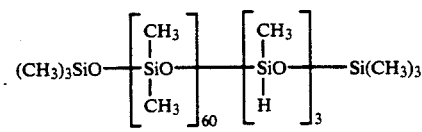

219 g of an allyl polyether represented by the average composition: $CH_2=CHCH_2O(CH_2CH_2O)_9CH_3$, 655 g of ethyl alcohol and sufficient quantity of neutralized chloroplatinic acid to give a platinum concentration of 5 ppm by weight with respect to the allyl polyether were mixed together, stirred at a temperature of 80° C., and reacted together for 5 hours. Residual SiH groups were eliminated by adding hexene, the reaction solution was strip purified under reduced pressure, and filtered to obtain the untreated polyether silicone (VIII).

800 g of the polyether silicone (VIII) thus obtained were treated with 50 g of $10^{-3}$N hydrochloric acid, and stirred at 90° C. for 4 hours. Another strip purification was then carried out under reduced pressure followed by filtration to give the purified polyether silicone (IX). The viscosity ($\eta^{25}$), density ($d^{25}$) and refractive index ($n_p^{25}$) of this polyether silicone (IX) were 217 cs, 1.000, and 1.4170 respectively.

Propionaldehyde Generation Test 1 g of polyether silicone and 1 g of $10^{-4}$N hydrochloric acid were weighed out in a 20 ml vial, and the vial sealed by a rubber septum with an aluminum cap.

Next, after aging at 60° C. for 24 hours in a drier, 1 μl of the aqueous layer or homogeneous layer which had separated was withdrawn under seal by a syringe, and the propionaldehyde content was determined by a gas chromatograph equipped with a hydrogen flame detector (FID). (A polyethylene glycol type column packing was used.) Also, after determining the quantity of propionaldehyde thus generated, the rubber septum was removed and an odor test was performed.

Test of Unsaturation Degree

The degree of unsaturation was measured from the proton NMR spectrum of the polyether silicone (400 MHz). The signals with a chemical shift of 4.5–6.5 were integrated, the intensity ratio with respect to all signals was found, and the unsaturation was calculated assuming it was due entirely to propenyl ether.

Table 1 below shows the results obtained.

TABLE 1

| Sample | Quantity of Propionaldehyde | Odor | Degree of Unsaturation |
| --- | --- | --- | --- |
| (VII) | 2,000 ppm | X | 0.04 |
| (IX) | 0 ppm | ⊚ | no more than 0.002 |
| (X) | 3,000 ppm | X | 0.05 |
| (XI) | 20 ppm | ○ △ | no more than 0.002 |
| (XII) | 10 ppm | ○ | no more than 0.002 |

Intensity of Odor:
⊚: Practically odorless
○: Very slight odor (not sufficient to identify the odorous constituent)
△: Slight odor (sufficient to identify the odorous constituent as propionaldehyde)
X: strong odor of propionaldehyde

EXAMPLE 2

273 g of a hydrogen siloxane of average composition:

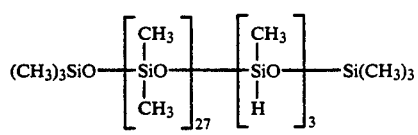

1,200 g of an allyl polyether represented by the average composition:

800 g of toluene, 0.2 g of a 2% isopropanol solution of chloroplatinic acid, and 0.2 g of potassium acetate as pH regulator, were weighed out and reacted together under toluene reflux for 6 hours. Residual SiH groups were practically undetected. The reaction solution was divided into two equal parts, one of which was strip purified and filtered without further modification to give the polyether silicone (X).

To the second part, 12 g of glacial acetic acid was added. After reaction for 5 hours under toluene reflux, strip purification and filtration were carried out to give the polyether silicone (XI). The viscosity ($\eta^{25}$), density ($d^{25}$) and refractive index ($n_p^{25}$) of this polyether silicone (XI) were 1,760 cs, 1.030 and 1.4472, respectively.

A propionaldehyde generation test and unsaturation degree test were carried out on the polyether silicone thus obtained in precisely the same way as in Example 1. Table 1 above shows the results.

EXAMPLE 3

601 g of a hydrogen siloxane of average composition:

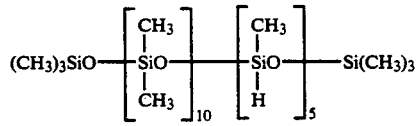

1,135 g of an allyl polyether represented by the average composition: $CH_2=CHCH_2O(CH_2CH_2O)_9H$, 1,200 g of isopropanol, 1 g of a 2% isopropanol solution of chloroplatinic acid, and 1 g of potassium acetate as pH regulator, were weighed out and reacted together under reflux for 4 hours. Residual SiH groups were then eliminated by treatment of the thus-produced polyether silicone with a 5% methanol solution of KOH at 30°–40° C. for 2 hours in order to eliminate it from the reaction system.

Next, after adding 1.2 g of concentrated hydrochloric acid, steam at 3 kg/cm² was introduced with stirring for 4 hours, and the reaction solution was strip purified and filtered to give the purified polyether silicone (XII). The viscosity ($\eta^{25}$), density ($d^{25}$) and refractive index ($n_p^{25}$) of this polyether silicone (XII) were 616 cs, 1.08, and 1.4502, respectively.

A propionaldehyde generation test and unsaturation degree test were carried out on the polyether silicone obtained in precisely the same way as in Example 1. Table 1 shows the results.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What i claimed is:

1. A purified polyether silicone addition product of a hydrogen siloxane and a polyoxyalkylene containing a terminal double bond which, in unpurified form, contains unreacted polyoxyalkylene, internal rearrangement side reaction products thereof, or both, which generate unpleasant odors in the reaction product upon storage and upon contact with water, wherein said purified polyether silicone addition product contains a total quantity of no greater than 100 ppm calculated on said polyether silicone of said unreacted polyoxyalkylene and rearrangement products thereof.

2. The purified polyether silicone of claim 1, wherein the degree of unsaturation thereof due to the presence therein of unreacted polyoxyalkylene and internal rearrangement side reaction products thereof is no greater than 0.02 meq/g.

3. The purified polyether silicone of claim 1, wherein said polyether silicone is produced by an addition reaction of at least one hydrogen siloxane represented by the structural formula:

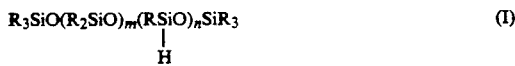

$$R_3SiO(R_2SiO)_m(RSiO)_nSiR_3 \quad (I)$$
$$\phantom{R_3SiO(R_2SiO)_m(}\overset{|}{H}$$

wherein R is a univalent substituted or unsubstituted hydrocarbon group, m is 0 or a positive integer, and n is a positive integer, or

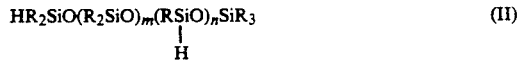

$$HR_2SiO(R_2SiO)_m(RSiO)_nSiR_3 \quad (II)$$
$$\phantom{HR_2SiO(R_2SiO)_m(}\overset{|}{H}$$

wherein R and m are selected from the same values as listed for formula (I), and n is 0 or a positive integer, or

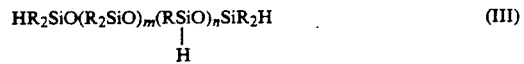

$$HR_2SiO(R_2SiO)_m(RSiO)_nSiR_2H \quad (III)$$
$$\phantom{HR_2SiO(R_2SiO)_m(}\overset{|}{H}$$

wherein R, m and n are selected from the same values as listed for formula (II); with a polyoxyalkylene represented by the formula:

$$BO(C_pH_{2p}O)_xR'' \quad (IV)$$

wherein B is a hydrocarbon group containing at least one terminal double bond, R" is hydrogen or a lower alkyl group or acyl group, p is 2 or 3, and x is a positive integer; in the presence of a platinum catalyst.

4. The purified polyether silicone addition product of claim 1, which comprises an organopolysiloxane containing a polyoxyalkylene group represented by the formula:

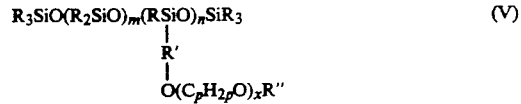

$$R_3SiO(R_2SiO)_m(RSiO)_nSiR_3 \quad (V)$$
$$\phantom{R_3SiO(R_2SiO)_m(}\overset{|}{\underset{O(C_pH_{2p}O)_xR''}{R'}}$$

wherein R is a univalent substituted or unsubstituted hydrocarbon group, m is 0 or a positive integer, and n is a positive integer, R" is hydrogen or a lower alkyl group or acyl group, p is 2 or 3, and x is a positive integer; and R' is a bivalent hydrocarbon group, or

$$AR_2SiO(R_2SiO)_m(RSiO)_nSiR_3 \quad (VI)$$
$$\phantom{AR_2SiO(R_2SiO)_m(}\overset{|}{A'}$$

wherein A and A' are both represented by the formula: —R'O($C_pH_{2p}$O)$_x$R"; wherein R, R', R", m, p and x are selected from the same values as listed for formula (V); and n is 0 or a positive integer, or

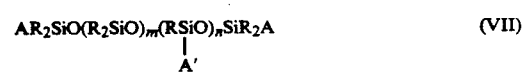

$$AR_2SiO(R_2SiO)_m(RSiO)_nSiR_2A \quad (VII)$$
$$\phantom{AR_2SiO(R_2SiO)_m(}\overset{|}{A'}$$

wherein A, A', R, m and n are selected from the same values as listed for formula (VI).

5. The purified polyether silicone addition product of claim 1, wherein said unreacted polyoxyalkylene and rearrangement products thereof are substantially completely decomposed by water, an aqueous solution with a pH of no greater than 7 or an acidic material, and thereafter removed from the polyether silicone.

6. The purified polyether silicone addition product of claim 5, wherein said aqueous solution contains at least one mineral acid.

7. The purified polyether silicone addition product of claim 5, wherein said aqueous solution contains at least one organic acid.

8. The purified polyether silicone addition product of claim 5, wherein said aqueous solution contains at least one Lewis acid.

9. The purified polyether silicone addition product of claim 5, wherein said aqueous solution contains at least one acid selected from the group consisting of hydrochloric acid, acetic acid, formic acid and trifluoroacetic acid.

10. The purified polyether silicone addition product of claim 5, wherein the amount of water used to decompose said unreacted polyoxyalkylene and rearrangement products thereof is 1–10 wt % of the polyether silicone.

11. The purified polyether silicone addition product of claim 1, wherein said unreacted polyoxyalkylene and rearrangement products thereof are substantially completely decomposed into aldehydes, ketones and polyoxyalkylene glycol and are removed thereafter from the polyether silicone.

12. The purified polyether silicone according to claim 2, wherein the degree of unsaturation is no greater than 0.002 meq/g.

13. In a method of preparing a preparation for hair care, skin care or make-up cosmetics, comprising blending a polyether silicone with a water-based hair care, skin care, or make-up cosmetic system, the improvement wherein said polyether silicone is a purified polyether silicone addition product according to claim 1.

14. The purified polyether silicone addition product of claim 3, wherein R is methyl.

15. The purified polyether silicone addition product of claim 3, wherein B is CH$_2$=CHCH$_2$— and p is 2.

16. The purified polyether silicone addition product of claim 3, wherein R is methyl, B is CH$_2$=CHCH$_2$—, and p is 2.

17. The purified polyether silicone addition product of claim 4, wherein R is methyl.

18. The purified polyether silicone addition product of claim 5, wherein the amount of water used to decompose said unreacted polyoxyalkylene and rearrangement products thereof is 0.1-100 wt % of the polyether silicone.

19. A purified polyether silicone addition product of a hydrogen siloxane and a polyoxyalkylene containing a terminal double bond which, in unpurified form, contains unreacted polyoxyalkylene, internal rearrangement side reaction products thereof, or both, which generate unpleasant odors in the reaction product upon storage and upon contact with water, wherein the degree of unsaturation thereof due to the presence therein of unreacted polyalkoxyalkylene, internal rearrangemeant side reaction products thereof, or both, is no greater than 0.02 meq/g and the total quantity of ketones and aldehydes produced by contacting the purified polyethersilicone in a closed system for 24 hours with a quantity of $10^{-4}N$ aqueous hydrochloric acid equivalent to the quantity of said polyether silicones at 60° C., is no greater than 100 ppm calculated on said polyether silicones.

20. A purified polyether silicone addition product containing less than 100 ppm unreacted polyalkylene and internal rearrangement products thereof, wherein said product is produced by the process comprising:
    treating an odor generating unpurified form thereof with (a) water, (b) an aqueous solution of pH no greater than 7 or (c) an acidic material, until substantially all of the unreacted polyoxyalkylene and internal rearrangement products thereof are converted to odorous substances, and
    then removing the odorous substances from the thus-treated polyether silicone,
    wherein water, said aqueous solution or said acidic material is added to a reaction solution obtained by conducting the addition reaction of a hydrogen siloxane with a polyoxyalkylene in a reaction solvent, heating and stirring the resulting mixture and then removing the thus-produced odorous substances by a strip purification.

* * * * *